(12) United States Patent
Chen et al.

(10) Patent No.: US 9,226,230 B2
(45) Date of Patent: Dec. 29, 2015

(54) HANDHELD DEVICE AND POWER SAVING CONTROL METHOD THEREOF

(71) Applicant: HTC CORPORATION, Taoyuan City, Taoyuan County (TW)

(72) Inventors: Pao-Haw Chen, Taoyuan (TW); Chien-Nan Lin, Taoyuan (TW); Ssu-Po Chin, Taoyuan (TW); Chi-Min Lee, Taoyuan (TW)

(73) Assignee: HTC CORPORATION (TW)

( * ) Notice: Subject to any disclaimer, the term of this patent is extended or adjusted under 35 U.S.C. 154(b) by 44 days.

(21) Appl. No.: 13/774,278

(22) Filed: Feb. 22, 2013

(65) Prior Publication Data

US 2013/0223314 A1 Aug. 29, 2013

Related U.S. Application Data

(60) Provisional application No. 61/602,343, filed on Feb. 23, 2012.

(51) Int. Cl.
*H04W 52/02* (2009.01)
*H04L 12/58* (2006.01)
*H04M 1/725* (2006.01)

(52) U.S. Cl.
CPC ...... *H04W 52/0209* (2013.01); *H04W 52/0251* (2013.01); *H04L 12/58* (2013.01); *H04L 12/587* (2013.01); *H04L 12/5895* (2013.01); *H04L 51/24* (2013.01); *H04M 1/72552* (2013.01); *H04M 1/72566* (2013.01); *Y02B 60/50* (2013.01)

(58) Field of Classification Search
None
See application file for complete search history.

(56) References Cited

U.S. PATENT DOCUMENTS

| | | | | |
|---|---|---|---|---|
| 6,014,707 A * | 1/2000 | Miller | ...... | H04L 29/06 370/252 |
| 6,278,876 B1 * | 8/2001 | Joshi | ...... | H04B 7/18517 455/427 |
| 6,301,609 B1 * | 10/2001 | Aravamudan | ...... | H04L 51/26 707/999.001 |
| 6,347,081 B1 * | 2/2002 | Bruhn | ...... | H04W 52/0216 370/318 |
| 6,487,184 B1 * | 11/2002 | Pecen | ...... | H04L 1/1628 370/329 |
| 6,512,817 B1 * | 1/2003 | Dale | ...... | H04M 3/2272 379/1.01 |
| 6,744,780 B1 * | 6/2004 | Gu | ...... | H04L 12/2697 370/346 |
| 6,751,193 B1 * | 6/2004 | Kudrimoti | ...... | H04W 28/14 370/231 |
| 6,877,098 B1 * | 4/2005 | Lavelle | ...... | G06F 1/3203 713/320 |
| 7,289,472 B2 * | 10/2007 | Yano | ...... | H04W 36/30 370/331 |
| 7,515,945 B2 * | 4/2009 | Ruuska | ...... | H04W 52/0216 455/41.2 |

(Continued)

*Primary Examiner* — Faruk Hamza
*Assistant Examiner* — Andrew Oh
(74) *Attorney, Agent, or Firm* — Cantor Colburn LLP

(57) ABSTRACT

A handheld device and a power saving method are provided. The handheld device comprises a transceiver and a processor electrically connected to the transceiver. The processor executes a sync procedure every a sync period to enable the transceiver to establish an internet connection with a mail server to receive a mail data, determine that the handheld device works in an idle mode, and automatically adjust the sync period by extending the sync period gradually.

12 Claims, 4 Drawing Sheets

(56) References Cited

U.S. PATENT DOCUMENTS

| | | | | |
|---|---|---|---|---|
| 7,590,100 B2* | 9/2009 | Smith | H04W 52/0229 | 370/329 |
| 7,676,226 B2* | 3/2010 | Han | H04W 36/30 | 455/436 |
| 7,680,520 B2* | 3/2010 | Ruuska | H04W 52/0216 | 370/311 |
| 7,809,384 B2 | 10/2010 | Vargas et al. | | |
| 7,962,604 B1* | 6/2011 | Morris | G06Q 30/02 | 705/14.4 |
| 8,175,532 B2* | 5/2012 | Nanda | H01Q 1/246 | 343/757 |
| 8,228,830 B2* | 7/2012 | Babin | H04W 40/02 | 370/311 |
| 8,433,374 B2* | 4/2013 | Deshpande | H04L 12/12 | 370/311 |
| 8,542,620 B2* | 9/2013 | Sampathkumar | H04W 52/0216 | 370/311 |
| 8,599,729 B2* | 12/2013 | Gobriel | H04W 52/0232 | 370/311 |
| 8,600,456 B2* | 12/2013 | Meier | H04L 29/12028 | 455/453 |
| 2002/0031119 A1* | 3/2002 | Brouet | H04L 12/403 | 370/386 |
| 2003/0061367 A1* | 3/2003 | Shah | H04L 47/10 | 709/230 |
| 2003/0119508 A1* | 6/2003 | Gwon | H04W 36/30 | 455/436 |
| 2004/0165563 A1* | 8/2004 | Hsu | H04W 48/18 | 370/338 |
| 2004/0176128 A1* | 9/2004 | Grabelsky | H04M 7/0003 | 455/553.1 |
| 2005/0090259 A1* | 4/2005 | Jain | H04L 29/06 | 455/439 |
| 2005/0124344 A1* | 6/2005 | Laroia | H04W 36/18 | 455/436 |
| 2005/0180429 A1* | 8/2005 | Ghahremani | H04L 12/5695 | 370/395.21 |
| 2005/0197171 A1* | 9/2005 | Son | H04W 52/28 | 455/574 |
| 2005/0229002 A1* | 10/2005 | Chiu | H04L 67/22 | 713/182 |
| 2006/0173971 A1* | 8/2006 | Russell | 709/217 | |
| 2007/0105586 A1* | 5/2007 | Kim et al. | 455/525 | |
| 2007/0111667 A1* | 5/2007 | Kwon | H04L 25/0226 | 455/67.11 |
| 2007/0253399 A1* | 11/2007 | Deshpande | H04L 12/12 | 370/347 |
| 2007/0281617 A1* | 12/2007 | Meylan | H04W 16/14 | 455/41.2 |
| 2008/0056218 A1* | 3/2008 | Binzel | H04L 1/1874 | 370/342 |
| 2008/0176571 A1* | 7/2008 | Choi | H04W 36/26 | 455/436 |
| 2008/0205345 A1* | 8/2008 | Sachs | H04W 36/0011 | 370/332 |
| 2008/0242269 A1* | 10/2008 | Lee et al. | 455/412.1 | |
| 2008/0270547 A1* | 10/2008 | Glickstien | H04L 67/1095 | 709/206 |
| 2008/0285588 A1* | 11/2008 | Balk | H04L 12/5885 | 370/466 |
| 2009/0077277 A1* | 3/2009 | Vidal | G06H 1/3203 | 710/46 |
| 2009/0089388 A1* | 4/2009 | Tian | H04L 51/14 | 709/206 |
| 2009/0180415 A1* | 7/2009 | Park | H04L 67/327 | 370/311 |
| 2009/0196211 A1* | 8/2009 | Wentink | H04W 52/0235 | 370/311 |
| 2009/0275349 A1* | 11/2009 | Bae | H04M 1/72544 | 455/466 |
| 2010/0124204 A1* | 5/2010 | Won | H04W 36/30 | 370/332 |
| 2010/0157941 A1* | 6/2010 | Raghothaman | H04W 36/30 | 370/331 |
| 2010/0174790 A1* | 7/2010 | Dubs | G06Q 10/10 | 709/206 |
| 2010/0226345 A1* | 9/2010 | Qu | H04W 36/385 | 370/338 |
| 2010/0250986 A1* | 9/2010 | Black | G06F 1/3203 | 713/323 |
| 2010/0274507 A1* | 10/2010 | Black | H04W 36/385 | 702/63 |
| 2011/0068923 A1* | 3/2011 | Burket | G08B 13/1427 | 340/572.1 |
| 2011/0140913 A1* | 6/2011 | Montenero | G08B 21/0233 | 340/870.07 |
| 2011/0158173 A1* | 6/2011 | Cucala Garcia | H04W 24/02 | 370/328 |
| 2012/0221877 A1* | 8/2012 | Prabu | 713/340 | |

* cited by examiner

HANDHELD DEVICE AND POWER SAVING CONTROL METHOD THEREOF

CROSS-REFERENCES TO RELATED APPLICATIONS

This application claims the benefit of priority based on U.S. Provisional Application Ser. No. 61/602,343 filed on Feb. 23, 2012, the entire content of which is also incorporated herein by reference.

BACKGROUND OF THE INVENTION

1. Field of the Invention

The present invention relates to a handheld device and a power saving control method thereof More particularly, the handheld device of the present invention automatically adjusts the sync period for executing a sync procedure with a mail server when the handheld device works in an idle mode.

2. Descriptions of the Related Art

With rapid advancement of the wireless communication technologies, people's demands for information are also increasing. There are more and more kinds of handheld devices being produced for meeting people's demands and being used nearly everywhere in people's daily life. For example, people use a mobile phone, a personal digital assistant (PDA), or a tablet computer to receive the mails from the mail server through the Internet.

Conventionally, when the handheld device works in the idle mode (i.e. when the handheld device is not operated by a user for a while), the handheld device still executes a sync procedure with a mail server every a sync period (e.g. 5 minutes) to automatically receive mails from the mail server. During the idle mode, the new incoming mails would not be read by the user until the user operates the handheld device. Therefore, the sync procedure will cause unnecessary power consumption if the sync procedure is executed too often during the idle mode.

Accordingly, an urgent need exists in the art to provide an automatic mechanism that can adjust the sync period of executing the sync procedure during the idle mode so as to achieve the purpose of power saving.

SUMMARY OF THE INVENTION

The primary objective of this invention is to provide an automatic mechanism that can adjust the sync period of executing the sync procedure during the idle mode so as to reduce the unnecessary power consumption.

To achieve the aforesaid objective, the present invention discloses a handheld device, which comprises a transceiver and a processor electrically connected to the transceiver. The processor is configured to execute a sync procedure every a sync period to enable the transceiver to establish an internet connection with a mail server to receive a mail data, determine that the handheld device works in an idle mode, and automatically adjust the sync period by extending the sync period gradually.

In addition, the present invention further discloses a power saving control method for use in a handheld device comprising a transceiver and a processor electrically connected to the transceiver. The power saving control method being executed by the processor and comprising the following steps of: (a) executing a sync procedure every a sync period to enable the transceiver to establish an internet connection with a mail server to receive a mail data; (b) determining that the handheld device works in an idle mode; (c) automatically adjusting the sync period by extending the sync period gradually The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

The present invention mainly relates to a handheld device and a power saving control method thereof It shall be appreciated that, description of the following embodiments is only for purpose of illustration rather than to limit the scope of the present invention. Moreover, in the following embodiments and the attached drawings, elements unrelated to the present invention are omitted from depiction; and dimensional relationships among individual elements in the attached drawings are illustrated only for ease of understanding but not to limit the actual scale.

Figure 1:
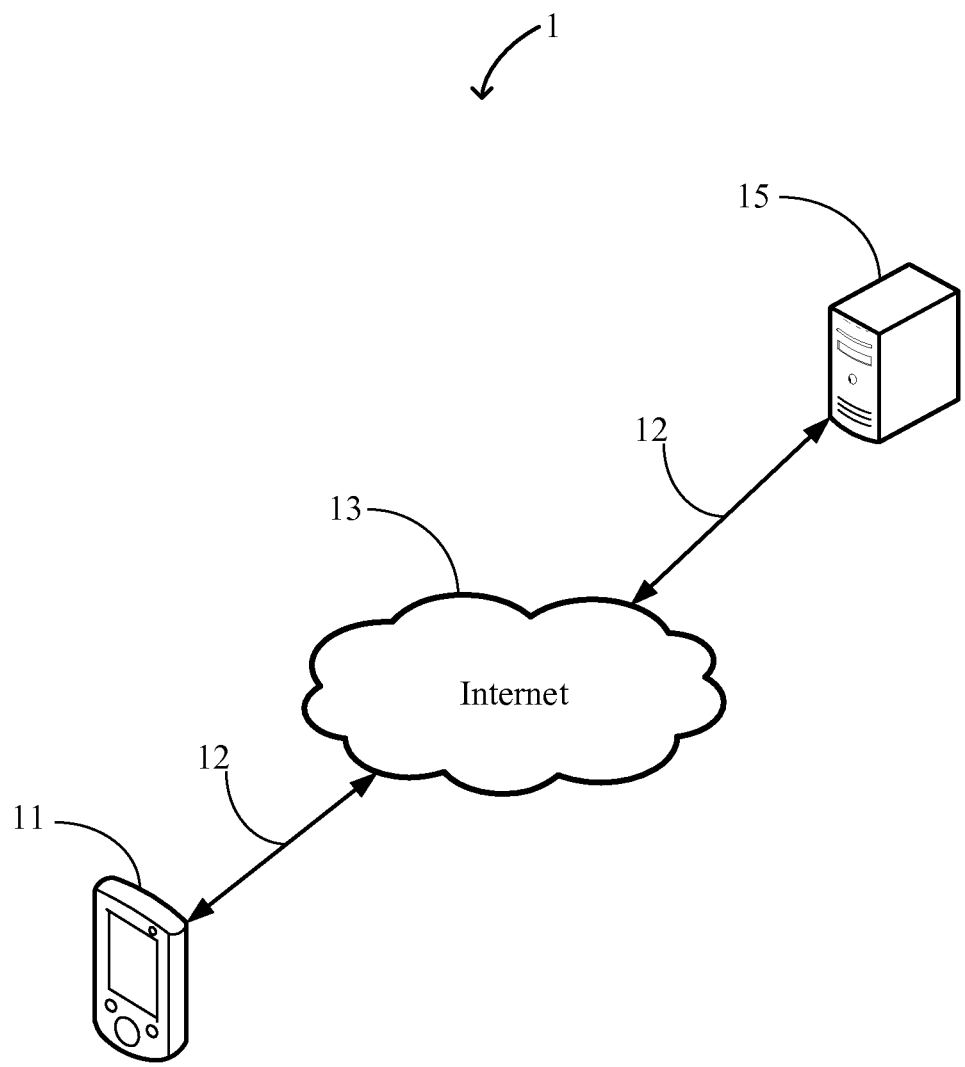
FIG. 1 is a schematic view of a network structure 1 according to a first embodiment of the present invention.
Figure 2:
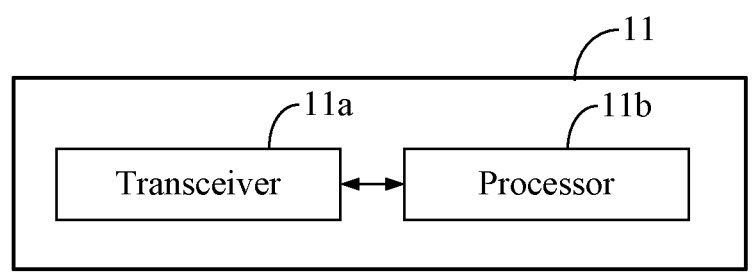
FIG. 2 is a schematic view of a handheld device 11 according to a first embodiment of the present invention.

FIGS. 1 and 2 depict a network structure 1 and a handheld device 11 in the network structure 1 according to a first embodiment of the present invention respectively. The network structure 1 comprises the handheld device 11, an Internet 13 and a mail server 15. The handheld device 11 may be a mobile phone, a personal digital assistant (PDA) or a tablet computer. The Internet 13 comprises telecommunications networks, computer networks etc. to provide a route for the handheld device 11 to establish an internet connection with the mail server 15.

As shown in FIG. 2, the handheld device 11 comprises a transceiver 11a and a processor 15. The processor 15 is electrically connected to the transceiver 11a and executes a sync procedure with the mail server 15. Specifically, the processor 15 runs an operating system and executes a mail application of the operating system in the background. The user can operate the handheld device 11 to select a sync option (e.g. "Push mail," "Manual" or "Smart Sync") on the operating system.

When the user selects the "Push mail" sync option, the processor 11b enables the transceiver 11a to establish an internet connection 12, keep the internet connection 12 and receive the mail data (e.g. the new incoming mail) from the mail server 15 in real time. When the user selects the "Manual" sync option, the processor 11b executes a sync procedure every a sync period to enable the transceiver 11a to establish the internet connection 12 with the mail server 15 to receive the mail data. The user can further select the sync period, e.g. 5 minutes, 10 minutes, 15 minutes, 30 minutes, 1 hour and so on by manual. The "Push mail" and "Manual" sync options are readily known by those of ordinary skill in the art, and thus will not be further described herein.

The "Smart Sync" sync option is the main content of the present invention for achieving the purpose of power saving.

It should be noticed that the phrase "Smart Sync" is only for purpose of description rather than limit the present invention to any specific phrase. The operations of "Smart Sync" are performed when the user selects the "Smart Sync" sync option or the processor 11b determines that the handheld device 11 works in an idle mode and then automatically changes the sync option from "Push mail" to "Smart Sync".

Based on the "Smart Sync" sync option, the processor 11b executes the sync procedure every the sync period to enable the transceiver 11a to establish the internet connection 12 with the mail server 15 to receive the mail data. Afterwards, the processor 11b determines that the handheld device 11 works in the idle mode, and automatically adjusts the sync period by extending the sync period gradually. In detail, the processor 11b continuously determines whether the handheld device 11 still works in the idle mode whenever executing the sync procedure. If the handheld device 11 still works in the idle mode, the processor 11b extends the sync period to make the next sync period longer than the present sync period.

For example, the processor 11b may set the sync period to 15 minutes in the beginning and doubles the sync period every time the processor 15b execute the sync procedure until the sync period is extended to 4 hours. In addition, the processor 11b may adjust the sync period by extending the sync period gradually in a plurality of stages (e.g. five stages) in which the next stage may not be the double of the previous stage, but must be longer than the previous stage.

Besides, the processor 15b may further observe the user's habit of operating the mail application of the operating system on the handheld device 11, e.g. the user may not launch the mail application often a day to check the new coming mails. Therefore, according to the execution of the mail application (i.e. the frequency of launching the mail application), the processor 15b could decide a minimum sync period (e.g. 1 hour), and sets the sync period to the minimum sync period in the beginning.

Figure 3:
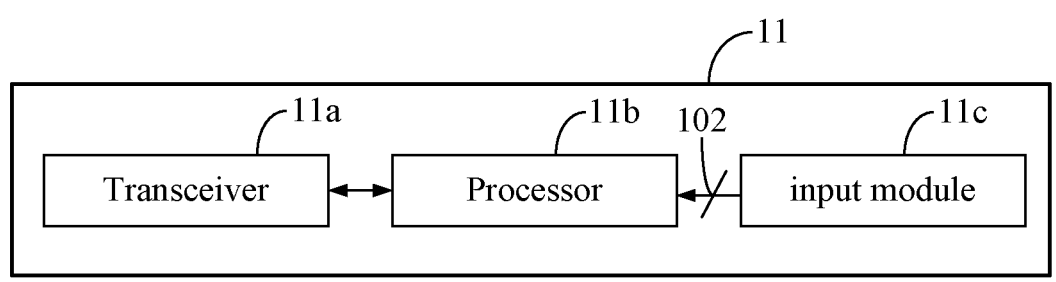
FIG. 3 is a schematic view of a handheld device 11 according to a second embodiment of the present invention.

FIG. 3 depicts a handheld device 11 according to a second embodiment of the present invention. As compared to the technical contents described in the first embodiment, the handheld device 11 in the second embodiment further comprises an input module 11c electrically connected to the processor 11b. The input module 11c may be a touch panel or a keyboard.

In the second embodiment, the processor 15b adjusts the sync period by extending the sync period gradually in a plurality of stages and the sync period of each of the stages is customized by the user. Specifically, the user may operate the input module 13c to set the sync period of each of the stages. In response to the user's operation of the input module 13c, the input module 13c generates a user input signal 102. Then, the processor 13b receives the user input signal 102 and sets the sync period of each of the stages according to the user input signal 102.

Figure 4:
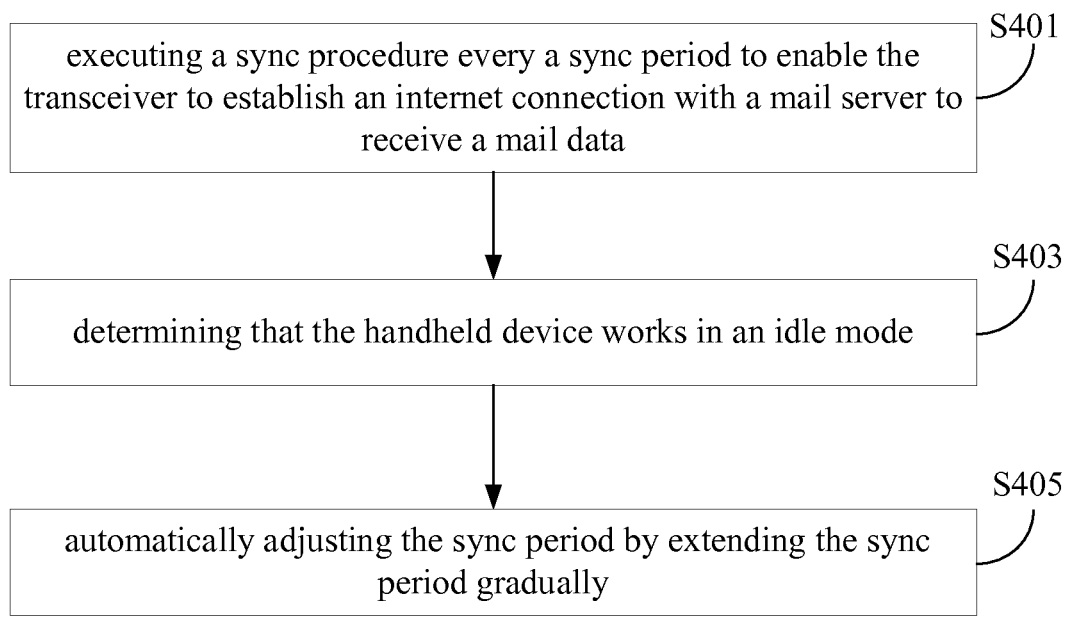
FIG. 4 is a flowchart diagram of a power saving control method according to a third embodiment of the present invention.

A third embodiment of the present invention is as shown in FIG. 4, which is a flowchart diagram of a power saving control method. The power saving control method of this embodiment can be used in a handheld device (e.g., the handheld device 11 of the first and second embodiments). The handheld device comprises a transceiver and a processor electrically connected to the transceiver. The power saving control method of the present invention is executed by the processor.

Firstly, step S401 is executed to execute a sync procedure every a sync period to enable the transceiver to establish an internet connection with a mail server to receive a mail data. Then, Step S403 is executed to determine that the handheld device works in an idle mode. Finally, step S405 is executed to automatically adjust the sync period by extending the sync period gradually.

In addition to the aforesaid steps, the power saving control method of this embodiment can also execute all the operations set forth in the first and second embodiments and accomplish all the corresponding functions. How the power saving control method of this embodiment executes these operations and accomplishes these functions can be readily appreciated by those of ordinary skill in the art based on the explanation of the first and second embodiments, and thus will not be further described herein.

According to the above descriptions, the handheld device and the power saving control method of the present invention could effectively reduce the unnecessary power consumption of the handheld device by automatically adjusting the sync period for executing a sync procedure with a mail server when the handheld device works in an idle mode. Therefore, the present invention provide an automatic mechanism that can adjust the sync period of executing the sync procedure during the idle mode to achieve the purpose of power saving.

The above disclosure is related to the detailed technical contents and inventive features thereof People skilled in this field may proceed with a variety of modifications and replacements based on the disclosures and suggestions of the invention as described without departing from the characteristics thereof Nevertheless, although such modifications and replacements are not fully disclosed in the above descriptions, they have substantially been covered in the following claims as appended.

What is claimed is:

1. A handheld device comprising:
a transceiver; and
a processor, electrically connected to the transceiver, being configured to determine whether the handheld device works in an idle mode, automatically change a sync option from a push mail option to a smart sync option when the processor determines that the handheld device works in the idle mode, and perform the following operations of the smart sync option:
execute a sync procedure every a sync period to enable the transceiver to establish an internet connection with a mail server to receive a mail data;
continuously determine whether the handheld device still works in idle mode every time the sync procedure is executed; and
automatically adjust the sync period by extending the sync period after the sync procedure is executed as long as the processor determines that the handheld device still works in the idle mode;
wherein the handheld device working in the idle mode indicates that the handheld device is not operated by a user for a predetermined period.

2. The handheld device as claimed in claim 1, wherein the processor adjusts the sync period by extending the sync period in a plurality of stages.

3. The handheld device as claimed in claim 2, further comprising an input module electrically connected to the processor, wherein the input module generates a user input signal and the processor receives the user input signal from the input module and sets the sync period of each of the stages according to the user input signal.

4. The handheld device as claimed in claim 3, wherein the input module is one of a touch panel and a keyboard.

5. The handheld device as claimed in claim 1, wherein the processor sets the sync period to 15 minutes in the beginning and doubles the sync period every time the processor execute the sync procedure until the sync period is extended to 4 hours.

6. The handheld device as claimed in claim 1, wherein the processor further decides a minimum sync period according to an execution of a mail application on the handheld device, and sets the sync period to the minimum sync period in the beginning.

7. A power saving control method for use in a handheld device, the handheld device comprising a transceiver and a processor electrically connected to the transceiver, the power saving control method being executed by the processor and comprising the following steps of:

determining whether the handheld device works in an idle mode;

automatically changing a sync option from a push mail option to a smart sync option when the processor determines that the handheld device works in the idle mode; and performing the following operations of the smart sync option:
  (a) executing a sync procedure every a sync period to enable the transceiver to establish an internet connection with a mail server to receive a mail data;
  (b) continuously determining whether the handheld device still works in the idle mode every time the sync procedure is executed; and
  (c) automatically adjusting the sync period by extending the sync period after the sync procedure is executed as long as the processor determines that the handheld device still works in the idle mode:, wherein the handheld device working in the idle mode indicates that the handheld device is not operated by a user for a predetermined period.

8. The power saving control method as claimed in claim 7, wherein the step (c) is adjusting the sync period by extending the sync period in a plurality of stages.

9. The power saving control method as claimed in claim 8, wherein handheld device further comprise an input module electrically connected to the processor, the input module generates a user input signal, and the power saving control method further comprises the following steps:

receiving the user input signal from the input module; and
  setting the sync period of each of the stages according to the input signal.

10. The power saving control method as claimed in claim 9, wherein the input module is one of a touch panel and a keyboard.

11. The power saving control method as claimed in claim 7, wherein the step (c) is setting the sync period to 15 minutes in the beginning and doubling the sync period every time executing the sync procedure until the sync period is extended to 4 hours.

12. The power saving control method as claimed in claim 7, further comprising the following steps:

deciding a minimum sync period according to an execution of a mail application on the handheld device; and
  setting the sync period to the minimum sync period in the beginning.

* * * * *